United States Patent
Bossert et al.

(10) Patent No.: US 11,113,489 B2
(45) Date of Patent: Sep. 7, 2021

(54) CODING AND IDENTIFYING PLATE-TYPE WORKPIECES

(71) Applicant: TRUMPF Werkzeugmaschinen GmbH + Co. KG, Ditzingen (DE)

(72) Inventors: Daniel Bossert, Nussdorf (DE); Klaus Bauer, Ditzingen (DE); Andreas Popp, Markgroeningen (DE); Eberhard Wahl, Weilheim an der Teck (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 16/851,220

(22) Filed: Apr. 17, 2020

(65) Prior Publication Data
US 2020/0311363 A1    Oct. 1, 2020

Related U.S. Application Data

(63) Continuation of application No. PCT/EP2018/077722, filed on Oct. 11, 2018.

(30) Foreign Application Priority Data

Oct. 19, 2017  (DE) .......................... 102017218692.5

(51) Int. Cl.
*G06K 7/10*     (2006.01)
*G06K 7/14*     (2006.01)
(Continued)

(52) U.S. Cl.
CPC ............. *G06K 7/1413* (2013.01); *G06K 1/12* (2013.01); *G06K 19/06028* (2013.01)

(58) Field of Classification Search
CPC ...... G06Q 20/1085; G06Q 20/18; G07D 7/04; G07D 7/12; G07D 11/50
(Continued)

(56) References Cited

U.S. PATENT DOCUMENTS 4,965,689 A * 10/1990 Normann ............... G06K 7/083
                                                235/449
4,978,917 A * 12/1990 Goldenfield ........... G21C 17/07
                                                235/462.01
(Continued)

FOREIGN PATENT DOCUMENTS

DE      4306209 A1    9/1994
DE     10248142 B3    7/2004
(Continued)

OTHER PUBLICATIONS

PCT International Search Report and Written Opinion in International Appln. No. PCT/EP2018/077722 , dated Jan. 21, 2019, 16 pages (with English translation).
(Continued)

*Primary Examiner* — Daniel St Cyr
(74) *Attorney, Agent, or Firm* — Fish & Richardson P.C.

(57) ABSTRACT

Methods and devices for coding and identifying plate-type workpieces are provided. The methods include: coding a workpiece by producing a code with a local modification in a material structure of a base material of the workpiece within a coding region, reading out the code by performing an eddy-current measurement of a local distribution of an electrical conductivity and/or a permeability of the base material by an eddy-current sensor along a reading-out section in a reading region at least partially including the coding region, a signal calibrated to a distance of the eddy-current sensor from a surface of the reading region being determined for reading out the code, storing the read-out code in a storage device, repeating the reading out of the code by repeatedly performing the eddy-current measurement, and identifying the workpiece by comparing the stored read-out code in the storage device and the repeated read-out code.

19 Claims, 5 Drawing Sheets

(51) Int. Cl.
     *G06K 1/12*           (2006.01)
     *G06K 19/06*         (2006.01)

(58) Field of Classification Search
     USPC ............................. 235/462.01, 462.25, 489
     See application file for complete search history.

(56) References Cited

U.S. PATENT DOCUMENTS

| | | | | |
|---|---|---|---|---|
| 5,340,962 | A * | 8/1994 | Schmidt | B23K 26/04 |
| | | | | 219/121.78 |
| 6,951,503 | B1 * | 10/2005 | Gotkis | B24B 37/005 |
| | | | | 451/21 |
| 2012/0296593 | A1 * | 11/2012 | Seccombe | F01D 17/20 |
| | | | | 702/94 |
| 2015/0275649 | A1 * | 10/2015 | Orban | E21B 47/09 |
| | | | | 73/152.54 |
| 2016/0282497 | A1 * | 9/2016 | Turnbeaugh | G01V 3/10 |

FOREIGN PATENT DOCUMENTS

| | | |
|---|---|---|
| DE | 102014221558 A1 | 4/2016 |
| DE | 102015202732 A1 | 8/2016 |
| WO | WO 1999/005636 A1 | 2/1999 |
| WO | WO 2019/076723 A1 | 4/2019 |

OTHER PUBLICATIONS

Document DE Office Action in German Appln. No. 102017218692.5, dated Dec. 23, 2020, 31 pages (with English translation).

* cited by examiner

CODING AND IDENTIFYING PLATE-TYPE WORKPIECES

CROSS REFERENCE TO RELATED APPLICATIONS

This application is a continuation of and claims priority under 35 U.S.C. § 120 from PCT Application No. PCT/EP2018/077722, filed on Oct. 11, 2018, which claims priority from German Application No. 10 2017 218 692.5, filed on Oct. 19, 2017. The entire contents of each of these priority applications are incorporated herein by reference.

TECHNICAL FIELD

The present disclosure relates to methods for coding and identifying plate-type workpieces, to metal-working, for example, sheet-metal-working, machines, and to the use of metal-working, for example, sheet-metal-working, machines.

BACKGROUND

So as to be able to identify and track products, it is known to provide the products with a code that can be read out.

DE 43 06 209 A1 describes a method in which bar code structures are notched into an electrically conductive material. For reading out, a reading head including an electromagnet arranged in an oscillating circuit is used, and induces a locally restricted eddy current in the material. The notches result in different distances of the reading head from the material and thus different magnetic resistances of the oscillating circuit, which are detected. A drawback of this method is that, for the purpose of the code, notches have to be made in the surface of the material, and the properties of the workpiece are potentially negatively influenced as a result. For example, the code is optically and haptically discernible. Since this is often not desired, additional working steps (filling, painting) have to be performed so as to make the structures of the code invisible.

DE 102 48 142 B3 describes a method for producing a magnetically scannable code in a metal component by generating permanent structural changes using a radiation source, which induces a modification to the magnetic conductivity in the irradiated regions by comparison with the non-irradiated regions of the component by changing the lattice structure and embedding ions. However, the method is limited to only a few materials that can be magnetized in this manner. In addition, the code thus achieved can only be read out using highly technically complex reading heads.

SUMMARY

Implementations of the present disclosure provide methods and devices for coding and identifying plate-type workpieces, which on one hand do not negatively influence the properties of the workpiece and on the other hand make it possible to extract, in a simple and reliable manner, information that can be used for identifying the workpieces.

One aspect of the present disclosure features methods of coding and identifying a plate-type workpiece. The methods include:

coding the workpiece, a code being produced in form of a local modification in the material structure of the base material of the workpiece, within a coding region;

reading out the code by measuring a local distribution of the electrical conductivity and/or the permeability of the base material of the workpiece by means of an eddy-current sensor, in a reading region at least partially including the coding region, along a reading-out section, where a signal calibrated to the distance of the eddy-current sensor from the surface of the reading region is determined;

storing the read-out code in a storage device (or a memory device);

repeating the reading-out of the code by means of eddy-current measurement; and comparing the stored code and the repeated read-out code.

The present disclosure combines coding by locally changing the microstructure of the base material of the workpiece with a distance-calibrated determination of eddy-current signals.

The local change in the microstructure can take place by way of local thermal and/or mechanical action (for example irradiation with laser radiation, hot or cold forming, additive methods such as build-up welding, for example, laser build-up welding) on the workpiece (for example a metal workpiece, for example, a metal sheet). The local change in the microstructure results in local differences in electrical and/or magnetic material properties (electrical conductivity and permeability) of the base material.

According to the present disclosure, an eddy-current sensor is used for reading out the code. The eddy-current sensor has a magnetic field generation device, for example a coil, that is set up to be flowed through by a current. In this context, by means of an alternating electrical current, a coil can generate an alternating magnetic field (excitation signal), which can induce eddy currents in the base material of the workpiece. The eddy-current sensor further has a magnetic field sensor. By means of the magnetic field sensor, the eddy-current density is detected by way of the magnetic field generated by the eddy current (eddy-current signals). The magnetic field sensor may also be a coil, in which an electrical current is induced by the magnetic field generated by the eddy current. However, there are also other technical options for detecting a magnetic field, for example a Hall sensor.

Information that is of interest for identifying the workpiece, such as differences in conductivity or permeability (code pattern), can be extracted from the detected eddy-current signals. This takes place within the reading-out process. The detected signals and/or the information extracted therefrom are stored in the storage device and can be called up for a subsequent identification in which the coding is read out again. The eddy-current signals measured during the repeated measurement and/or the information extracted therefrom are compared for matching with the eddy-current signals and/or information extracted therefrom already stored in the storage device. If there is a positive match, a part number linked to the read-out code and referenced in the storage device can be outputted on a PC screen and a workpiece can thus be unambiguously identified.

Eddy-current sensors can be used for distance and layer thickness measurement. For this purpose, a magnetic field is generated and an electrically conductive body is displaced in this magnetic field. A voltage is induced in the conductive material, and is dependent on the magnetic field strength and thus dependent on the distance of the conductive material from the device generating the magnetic field. The induced voltage in the conducting material generates eddy currents therein. These eddy currents now in turn again generate a magnetic field, which opposes the applied magnetic field. This magnetic field generated by the eddy currents can now in turn be measured, and is, as a result of its dependency, a measure of the distance of the conducting material from the externally applied magnetic field.

By contrast, according to the present disclosure, eddy-current signals are determined that are uninfluenced by any variations in distance (distance-calibrated). In this way, local changes in microstructure differences can be derived from the measured eddy-current signals at high resolution. For example, by using a wide frequency spectrum, for example from 10 kHz to 100 Hz, microstructure changes at different penetration depths can be determined. Using analytical methods and machine-learning algorithms, the quality or hit rate of the part identification can be improved.

The present disclosure makes coding possible that is not optically and haptically discernible, even of structured workpieces, by way of microstructure changes.

By way of the code and/or another workpiece treatment, a change in the surface contour of the base material of the workpiece can be generated before the first reading-out. This is the case for example if shaping tools are used for the coding or if shaping provided in accordance with a treatment instruction is carried out. Thus, the plate-type workpiece can be provided with structures (for example notches, creases, indentations etc.), leading to a change in the surface contour. Before the code is read out, the workpiece thus has a non-planar surface. The decisive factor is the surface of the base material of the workpiece, the material structure of which is changed by the coding and not that of any applied paint or coating, The determination of an eddy-current signal, which is calibrated to the distance between the reading device and the surface of the workpiece, ensures that variation in the signal strength is not distorted as a result of a varying distance, but rather the electrical and/or magnetic property of the microstructure change in the base material can be derived from the signal strength. The eddy-current sensor and workpiece can thus, in spite of an uneven surface, be displaced relative to one another within a plane parallel to the surface extension of the workpiece, without the unevennesses in the surface distorting the measurement result. It is not necessary to track the eddy-current sensor perpendicular to the surface extension of the workpiece.

Distance calibration of this type can be achieved in that, between coding and reading out the code, the base material is shaped in the reading region, in such a way that the modification to the surface contour of the base material is eliminated within the reading region. The base material thus has a smooth surface in the reading region, in such a way that the eddy-current sensor can be placed on the workpiece exactly, for example, by means of a vacuum cup. By means of the shaping, optical and/or haptic covering of the coding can also be achieved. The code can thus be optically and haptically concealed but still be read out nevertheless.

Alternatively or in addition, a uniform thickness of the base material can be generated by way of the shaping of the base material in the reading region.

A further option for achieving distance calibration of the detected eddy-current signals, according to the present disclosure, involves the surface contour of the base material of the workpiece being detected along the reading-out section. Thus, when the code is read out, a contour correction can be carried out, which causes signal modifications, resulting from a modification to the surface contour along the reading-out section, to be cancelled out from the signal detected by the eddy-current sensor. Thus, within the reading-out process, a signal adjusted for the surface contour of the base material in the reading region is determined. The contour correction can take place simultaneously with or after the detection of the eddy-current signal. This may be the exact contour of the workpiece surface. However, it is also possible to cancel out a rough contour, for example the waviness of the workpiece, from the detected signal using the contour correction, so as to increase the sensitivity of the measurement.

Alternatively or in addition, the thickness of the base material of the workpiece can be detected along the reading-out section. Thus, when the code is read out, a thickness correction can be carried out that cancels out signal modifications, resulting from a modification to the thickness of the base material along the reading-out section, from the signal detected by the eddy-current sensor.

In some embodiments, the reading-out section is an isoline along which the base material of the workpiece has a unitary thickness and/or the surface of the material is planar. Reading out along an isoline ensures that the microstructure changes in the base material, and thus the differences in conductivity or permeability, can be derived from the detected signal directly (without distance correction).

After the first reading-out of the code, the workpiece may be subjected to further treatment, for example painting, bending, and/or punching. It can be ensured that the code is recognized after further treatment or after unintended deformation of the coded workpiece if a microstructure change in the base material is generated by the coding in such a way that, at least in a sub-region of the coding region, the modification to the conductivity and/or permeability resulting from the code is greater than that which results from the further treatment. This makes further treatment possible without reference measurements being required after each treatment step. Thus, for part identification, for example the signals received from the aforementioned sub-region are used. This sub-region should include at least 30% of the coding region.

The coding can be carried out in such a way that the probability of recognizing the code is so high that the code can be found even if the coding region is not known in a subsequent reading process. A shaped and coded metal piece, for example, sheet-metal piece, may, for example, be part of a vehicle body or a machine. If a sensor, for example, of a service employee or security staff, is now used to read out the code, which cannot be seen or felt from the outside, the location of this coding region may still be unknown even though it may be known that there must be a code of this type. If, for reading out, the sensor is passed along the entire surface of the workpiece, a very large number of patterns will be detected. So as to distinguish these from the actual code, for example a pre-established, sufficiently high number of coded points may be formed in the workpiece, or a particular size of the coded surface can be predetermined, which induces a significant number of signals above a threshold value when read out. It is also possible to provide the workpieces with a base code pattern (which may be the same for all workpieces) in the vicinity of the individual code. Once the base code pattern has been detected, it is known that the actual code pattern is in the vicinity. Moreover, the coding can also be used to insert a check code, for example a checksum, in the workpiece. It can thus be ensured that patterns that are not a code are not accidentally detected as an intentional code. If the base code pattern or the check code calculation are not generally accessible information, this increases the security against undesired finding or reading-out of the code, for example if intentional deletion or falsification of the code is to be prevented.

The present disclosure also relates to a metal-working machine, for example, a sheet-metal-working machine, including an eddy-current sensor for detecting eddy-current signals, an evaluation device for extracting information from the detected signals, for example the local distribution of the conductivity and/or permeability of a workpiece, a memory device for storing the information, and a control device that is set up to carry out the above-described method. The metal-working machine may be a machine that can treat a metal workpiece, for example a metal sheet, in one or more of the following ways: cutting, punching, bending, cold and/or hot forming, shearing, pressing, rolling, coating, milling, welding, punch-marking, drilling, thread-cutting, riveting, etc.

The evaluation device can be constructed in analog or digital form or a combination of the two. A digital evaluation device can be constructed from logical devices, for example from programmable logic devices (PLDs). It can include a microprocessor and a data memory and a program memory. The program may include algorithms for extracting information from the detected signals, for example, the local distribution of the conductivity and/or permeability of a workpiece. For detecting location and movement data of the eddy-current sensor, the eddy-current sensor can include an acceleration sensor and/or a gyro sensor and/or a receiver for determining the location of the eddy-current sensor. An acceleration sensor is a device that can detect acceleration in one or more different directions along a straight line or a plane or in space. A receiver for location determination can, for example, be a global positioning system (GPS) receiver. More generally, it can be a receiver of electromagnetic waves, for example, light or radio waves, sound waves, or other signals by which the location with respect to one or more fixed points can be unambiguously determined. Using a receiver of this type, the position of the eddy-current sensor can be determined even if the eddy-current sensor is not being moved.

In some embodiments, the metal-working machine is a laser processing machine or a machine for shaping treatment such as bending, rolling, pressing, etc.

The present disclosure also relates to a use of metal-working machines, of eddy-current sensors for detecting eddy-current signals, of devices for extracting information from the detected signals, for example, the local distribution of the conductivity and/or permeability of a workpiece, and of memory devices for storing the information, for carrying out the above-described method. The devices for extracting information, the memory devices and the eddy-current sensors can be external devices (in other words not belonging to the metal-working machine), which are, for example, used jointly with other metal-working machines.

All method steps and device features mentioned above and in the following and the resulting effects can further improve the use.

The working machines can operate in a computer-controlled manner and form the workpieces from a base material in accordance with one or more treatment instructions that are stored in the form of digital data. For this purpose, programs can be used to which the contours and configuration of the fully shaped workpiece are conveyed or that are generated by these themselves. An additional module, which invites the user to input a coding pattern into the workpiece, can now be provided to a program of this type. The program can offer a selection of different code patterns. The program can query whether the code pattern is to be optically and/or haptically concealed. If this option is selected, the program can be configured in such a way that it makes a suggestion for the coding region and thus takes into account the further shaping provided in accordance with the operating instruction and uses it at least in part for coding and/or concealing. The program can be an executable program code located on a storage medium and/or be carried out in the individual method steps. The storage medium can be part of the aforementioned memory device.

Further advantages of the present disclosure will be apparent from the description and the drawings. Likewise, the aforementioned features and those cited in the following can each be used individually in their own right or in a plurality in any desired combinations. The shown and described embodiments are not to be understood as a definitive list, but rather are examples for illustrating the present disclosure.

DETAILED DESCRIPTION

According to the present disclosure, a local modification to the material structure and thus to the conductivity and/or permeability of the base material of a workpiece 1 is generated as a code and read out by eddy-current measurement. Microstructure changes can for example be introduced to the workpiece 1 by means of suitable shaping, for example by hot or cold forming. Cold forming refers to plastic deformation of metals below the recrystallization temperature, for example cold rolling, thermoforming, bending, whetting or even hammering and shot blasting. The electrical conductivity and the initial permeability are changed, for example decreased, as a result of cold forming. Microstructure changes may also be achieved by hot forming, for example by quenching or cooling the workpiece.

Figure 1:
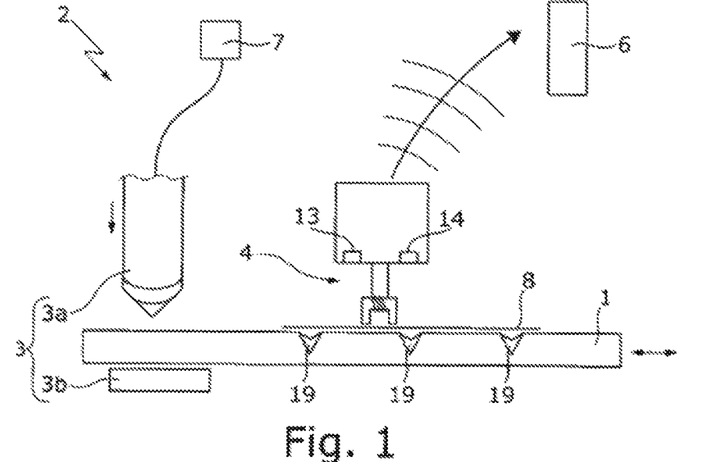
FIG. 1 shows a first embodiment of a metal-working machine according to the present disclosure, including a shaping tool and a workpiece under treatment.

A metal-working machine, for example, a sheet-metal-working machine 2 suitable for this purpose is shown in FIG. 1. In the example shown in FIG. 1, this is a sheet-metal-working machine 2 having a shaping tool (or shaper) 3 that includes a center-punching or hammering tool 3a and an underlay 3b (counter-bearing). The metal-working, for example, sheet-metal-working machine 2 includes an eddy-current sensor 4, by means of which signals can be detected. From the detected signals, information of interest for identifying the workpiece, such as conductivity or permeability differences, can be extracted by means of an evaluation and comparison device (or an evaluator and/or comparator) 6 using algorithms and machine learning. This information can subsequently be linked to an identification number and stored in a storage device (e.g., a memory device) 5. The metal-working, for example sheet-metal-working machine 2 can further include a control device (or controller) 7 for actuating the shaping tool 3. Depending on the configuration of the shaping tool 3 and/or the control of the shaping tool 3 by means of the control device 7, a predetermined code pattern can be generated in a coding region 8. The control device 7 may further be set up to control the movement of the eddy-current sensor 4 and the strength of the magnetic field introduced into the workpiece by the eddy-current sensor 4.

By means of the shaping tool 3, the surface of the workpiece 1 is deformed, bringing about a modification to the material structure and thus to the conductivity and/or permeability of the base material of the workpiece 1 in regions 19 of the mechanical surface treatment. The modification to the conductivity and/or permeability can be measured by means of the eddy-current sensor 4, which is moved past over the workpiece 1.

If the eddy-current sensor 4 is moved over the workpiece 1 to read out the code, this movement can be detected by way of a further sensor 13 (gyro sensor and/or acceleration sensor), in such a way that the signal can be specified as a function of the location (in this case for example along the direction x). In some embodiments, the eddy-current sensor 4 is not fixedly installed in the working device 2, but rather is part of a portable reading device. By way of a receiver 14 for location determination (for example a Global Positioning System (GPS) sensor), the site of the workpiece 1 can further be determined when the code is read out and conveyed for example to a product purchaser over the Internet. By way of the comparison device 6 (for example including an app that is connected to a database via the Internet), the code can be checked for authenticity. For this purpose, the data of the sensors 4, 13, 14 are conveyed, e.g., via a wireless local area network (WLAN), to the comparison device 6, where the data of the sensors are compared with the signature data stored in the storage device 5. In this way, the workpiece 1 can be identified and properties of the workpiece 1 that are stored in the storage device 5 can be verified.

Figure 2:
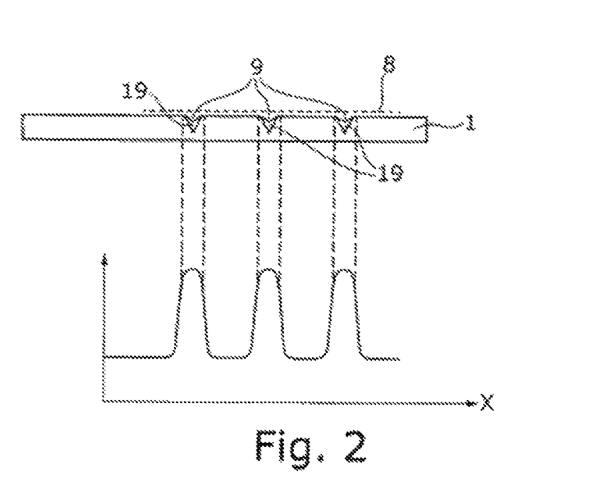
FIG. 2 shows a workpiece coded by a method according to the present disclosure and the local modification to the signal intensity as a result of the implemented code.

FIG. 2 shows the workpiece 1, in which microstructure changes have been introduced in regions 19 by shaping (e.g., plastic indents; in the present case, notches 9). Further, FIG. 2 shows the local modification to the signal intensity due to the introduced notches 9. The detected signal may be stored in the storage device 5 of the metal-working, for example sheet-metal working machine 2, or be compared in the comparison device 6 with a signal stored in the storage device 5 (for example if the coded workpiece 1 is brought to a different workstation where the reading-out of the code is repeated). Furthermore, in the storage device 5, information regarding the correspondingly coded workpiece 1 may be stored, for example relating to a treatment instruction, time of treatment, etc.

Figure 3:
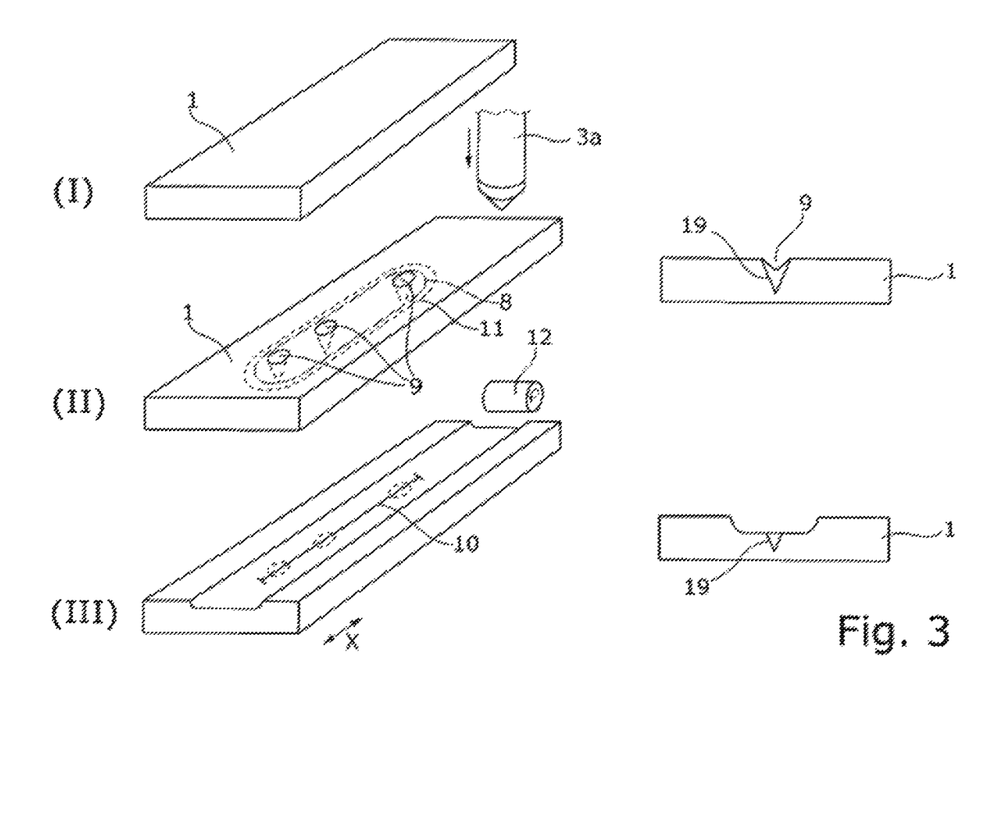
FIG. 3 shows a three-dimensional drawing of an uncoded workpiece in drawing region (I), a three-dimensional drawing and a sectional drawing of a workpiece coded by shaping in drawing region (II), and a three-dimensional drawing and a sectional drawing of the coded workpiece from drawing region (II) in drawing region (III), after further shaping in accordance with a first variant (smoothing the surface in the reading region).

The measurement signal detected by the eddy-current sensor 4 is basically dependent on the parameters of conductivity, permeability, and distance between the eddy-current sensor 4 and the surface of the base material of the workpiece 1. As a result of the microstructure change by way of shaping, an originally planar workpiece 1 (as shown in FIG. 3, drawing region (I)) may have a structured surface after the coding, since for example notches 9 have been introduced into the surface, as is shown in FIG. 3 in drawing region (II). To prevent the modification to the surface contour from distorting the signal determined by the eddy-current sensor 4, in the variant of the coding method according to the present disclosure shown in FIG. 3 in drawing region (III), it is provided that further shaping of the workpiece 1 is performed, by means of which the surface of the workpiece 1 is changed in such a way that the distance between the eddy-current sensor 4 and the surface of the workpiece 1 along a reading-out section 10 or in a reading region 11 (section or region on the surface of the workpiece 1 along or within which the eddy-current sensor 4 is moved for reading the code) is constant. In the example shown in drawing region (III) of FIG. 3, the workpiece 1 is rolled in the reading region 11 that includes the coding region 8 by means of a rolling tool 12, and a planar surface is thus generated in the reading region 11. The eddy-current sensor 4 can thus be displaced within the reading region 11 at a constant distance from the surface of the workpiece 1, without having to perform a movement perpendicular to the surface so as to keep the distance from the workpiece 1 constant. The eddy-current sensor 4 can thus move on an isoline with respect to the workpiece surface for the reading-out. Furthermore, by way of the further shaping, it can also be ensured that the workpiece 1 has a constant thickness at least in the reading region 11, for example, when non-ferromagnetic workpieces are read out, since in this case the material thickness also has an influence on the detected eddy-current signal. The eddy-current sensor 4 can thus detect signals from which information regarding the changed conductivity and/or permeability can be extracted directly. In some embodiments, the further shaping is shaping that can be carried out in any case in accordance with a treatment instruction assigned to the workpiece 1 (for example rolling, bending). The coding can thus take place before or during the treatment of the workpiece 1 in accordance with the treatment instruction.

Figure 4:
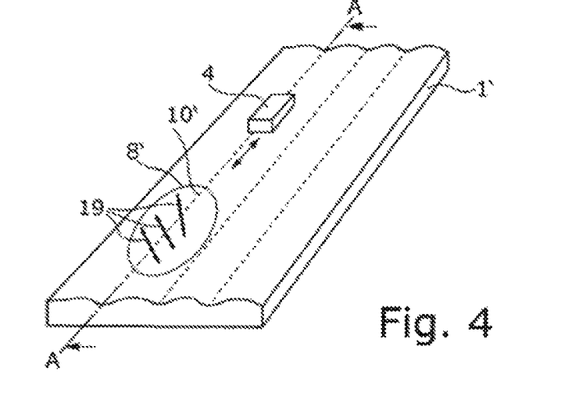
FIG. 4 is a three-dimensional drawing of a coded workpiece having a non-planar surface, in which a code is read out along an isoline.
Figure 5:
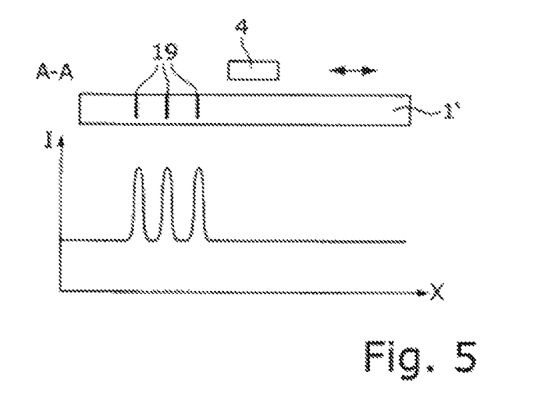
FIG. 5 is a sectional drawing of the workpiece of FIG. 4 along the isoline, showing the local modification to the signal intensity as a result of the introduced code.

For workpieces that have a surface structure in the form of a non-planar surface in the coding region but in which the existing surface structure cannot or should not be eliminated (for example if waviness of the workpiece is desired), an undesired influence on the eddy-current signal from the surface structure of the workpieces can be prevented by suitably selecting the reading-out section. FIG. 4 shows an isoline 10' (in other words a line along which the eddy-current sensor 4 is at a constant distance from the surface of the base material of the workpiece 1) along which the reading-out section may extend. A workpiece 1' having a wavy surface structure has been provided with a code in a coding region 8'. For reading out the code, in the example shown, the eddy-current sensor 4 is displaced along a "wave trough" of the wave structure of the workpiece surface. FIG. 5 is a section along the wave trough isoline 10', showing the signal detected by the eddy-current sensor 4.

In both cases (generating a reading region 11 having a planar surface or selecting the reading-out section along an isoline 10'), an eddy-current signal calibrated to the distance of the sensor 4 from the surface of the base material of the workpiece 1, 1' is obtained.

Furthermore, for known surface structures, a structure correction may also be carried out by means of the evaluation and comparison device 6.

Figure 6:
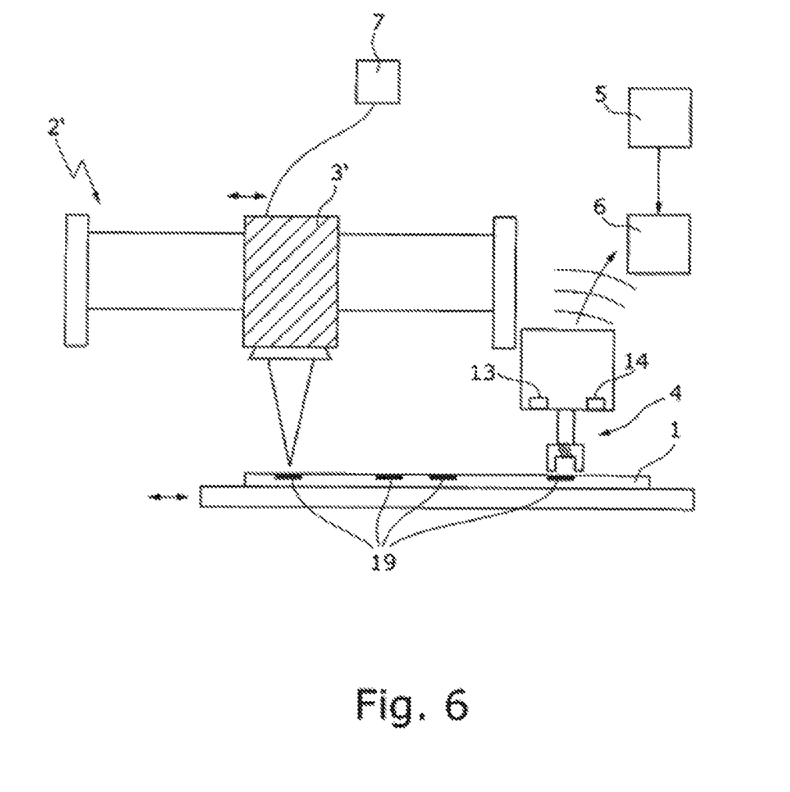
FIG. 6 shows a second embodiment of a metal-working machine according to the present disclosure, including a laser processing head and a workpiece under treatment.

Instead of a sheet-metal-working machine 2 including a shaping tool, a microstructure change suitable for coding can also be generated by means of a laser processing machine 2' including a laser processing head 3', as shown in FIG. 6.

Figure 7A:
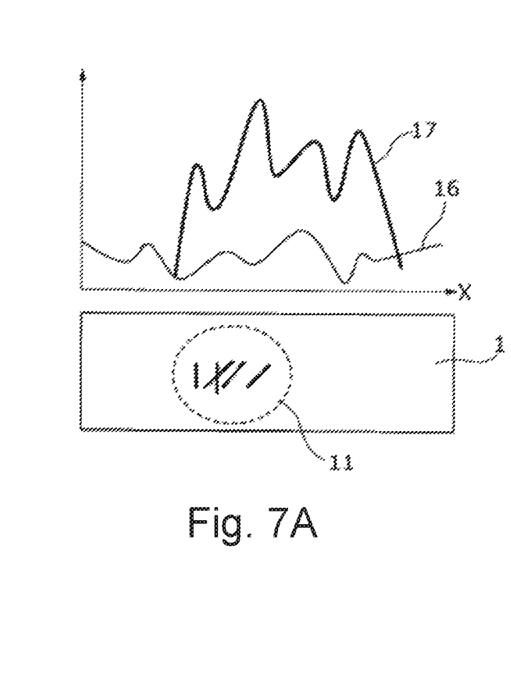
FIG. 7A shows a coded workpiece and the intensity of the measured eddy-current signal before further shaping.
Figure 7B:
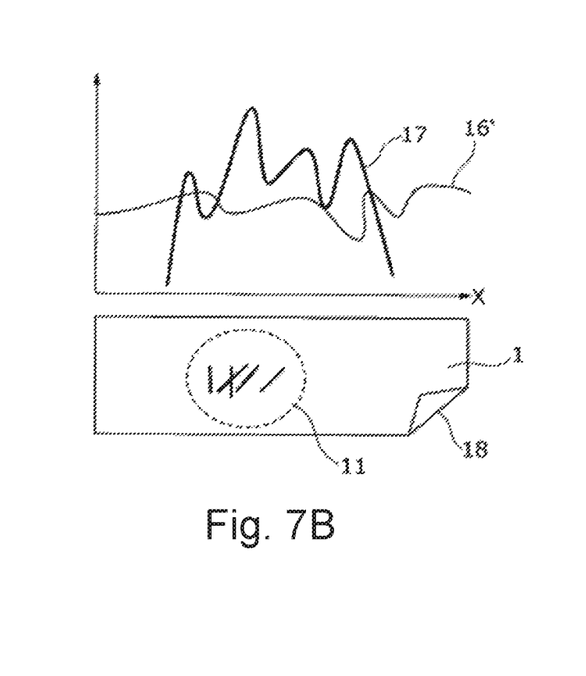
FIG. 7B shows a coded workpiece and the intensity of the measured eddy-current signal after further shaping.

The coding according to the present disclosure of plate-type workpieces 1, by way of microstructure changes in combination with detection of the microstructure changes by means of the eddy-current sensor 4, is suitable for workpieces 1 that have to be processed further after the coding and have to be identified for this purpose. However, there is the risk that the workpiece 1 is deformed by the further processing or else by an accident, potentially resulting in undesired microstructure changes, including in the reading region 11. Deformations in the region adjacent to the reading region can also change the microstructure changes in the reading region. At a greater distance from the reading region, the influence decreases and can be ignored. FIG. 7A shows eddy-current signals 16 of the workpiece 1 without coding (thin line 16=base surface) and eddy-current signals 17 of the code (thick line 17=code pattern). As a result of undesired deformation (bending 18) outside the reading region 11, the eddy-current pattern of the workpiece 1 also changes in the reading region 11. FIG. 7B shows the eddy-current signal 16', changed by the bending 18 introduced outside the reading region 11, without coding. So as nevertheless to ensure identification of an unavoidably or undesirably deformed workpiece 1 of this type, the intensity of the coding (intensity of application of force during shaping or intensity of the laser) is selected sufficiently high that the code pattern 17 rises up from the base surface 16'. In this way, the code can reliably be found and read out even after further treatment. Using the described method and device, a key system that is difficult to falsify can be implemented, with keys as workpieces 1 and a lock as an eddy-current sensor 4.

OTHER EMBODIMENTS

A number of embodiments of the present disclosure have been described. Nevertheless, it will be understood that various modifications may be made without departing from the spirit and scope of the present disclosure. Accordingly, other embodiments are within the scope of the following claims.

LIST OF REFERENCE NUMERALS

1 Workpiece
2 Metal-working machine, for example, sheet-metal-working machine
3 Shaping tool
3a Center-punching or hammering tool
3b Underlay
4 Eddy-current sensor
5 Memory device
6 Evaluation and comparison device
7 Control device
8, 8' Coding region
9 Notches
10 Reading-out section
10' Isoline
11 Reading region on workpiece surface
12 Rolling tool
13 Gyro sensor and/or acceleration sensor
14 Receiver for location determination, for example GPS receiver
16 Eddy-current signal without code (base surface) before further treatment
16' Eddy-current signal without code (base surface) after further treatment
17 Eddy-current signal of code (code pattern)
18 Deformation (bending)
19 Regions having changed material structure

What is claimed is:

1. A method of coding and identifying a plate-type workpiece, the method comprising:
   coding the workpiece by producing a code with a local modification in a material structure of a base material of the workpiece within a coding region;
   reading out the code by performing an eddy-current measurement of a local distribution of at least one of an electrical conductivity or a permeability of the base material of the workpiece by an eddy-current sensor along a reading-out section in a reading region, wherein the reading region at least partially comprises the coding region, wherein an eddy current signal calibrated to a distance between the eddy-current sensor and a surface of the base material of the workpiece is determined for the reading out of the code, and wherein the determined calibrated eddy current signal in the reading region is independent from the distance and is associated with the read-out code;
   storing the read-out code in a storage device;
   repeating the reading out of the code by repeating the eddy-current measurement; and
   identifying the workpiece by comparing the stored read-out code in the storage device and the repeated read-out code.

2. The method of claim 1, wherein, by at least one of the coding or another workpiece treatment, a change in a surface contour of the base material of the workpiece is generated before a first reading out of the code.

3. The method of claim 2, further comprising:
   between the coding and the reading out of the code, shaping the base material in the reading region such that the change to the surface contour of the base material is eliminated within the reading region.

4. The method of claim 1, further comprising:
   detecting a surface contour of the base material of the workpiece along the reading-out section; and
   when the code is read out, carrying out a contour correction to cancel out a signal modification from an eddy-current signal detected by the eddy-current sensor, wherein the signal modification results from a modification to the surface contour along the reading-out section.

5. The method of claim 1, further comprising:
   detecting a thickness of the base material of the workpiece along the reading-out section; and
   when the code is read out, carrying out a thickness correction to cancel out a signal modification from an eddy-current signal detected by the eddy-current sensor, wherein the signal modification results from a modification to the thickness of the base material along the reading-out section.

6. The method of claim 1, wherein the reading-out section comprises an isoline along which the base material of the workpiece has at least one of a unitary thickness or a planar surface.

7. The method of claim 1, wherein, after a first reading-out of the code, the workpiece is subjected to a further treatment, and wherein coding the workpiece comprises:
generating a microstructure change in the base material due to the coding such that, at least in a sub-region of the coding region, a modification to the at least one of the electrical conductivity or the permeability resulting from the code is greater than that resulting from the further treatment.

8. The method of claim 7, wherein the further treatment comprises at least one of painting, bending, or punching.

9. The method of claim 1, wherein identifying the workpiece comprises:
in response to determining that the repeated read-out code matches the stored read-out code in the storage device, displaying a part number linked to the stored read-out code and referenced in the storage device.

10. The method of claim 1, further comprising:
producing a basic code pattern or a check code in a vicinity of the local modification in the material structure of the base material of the workpiece.

11. A metal workpiece working machine comprising:
an eddy-current sensor configured to detect eddy-current signals;
an evaluation device configured to extract information from the detected eddy-current signals;
a storage device configured to store at least one of the extracted information or the detected eddy-current signals; and
a controller configured to control operations comprising:
coding the workpiece by producing a code with a local modification in a material structure of a base material of the workpiece within a coding region;
reading out the code by performing an eddy-current measurement of a local distribution of at least one of an electrical conductivity or a permeability of the base material of the workpiece by the eddy-current sensor along a reading-out section in a reading region, wherein the reading region at least partially comprises the coding region, wherein an eddy current signal calibrated to a distance between the eddy-current sensor and a surface of the base material of the workpiece is determined for the reading out of the code, and wherein the determined calibrated eddy current signal in the reading region is independent from the distance and is associated with the read-out code;
storing the read-out code in the storage device;
repeating the reading out of the code by repeating the eddy-current measurement; and
identifying the workpiece by comparing the stored read-out code in the storage device and the repeated read-out code.

12. The working machine of claim 11, wherein the eddy-current sensor, comprises at least one of:
an acceleration sensor,
a gyro sensor, or
a receiver for location determination.

13. The working machine of claim 11, wherein the working machine comprises a laser processing machine or a shaping treatment machine.

14. The working machine of claim 11, wherein the working machine is configured to:
detect a surface contour of the base material of the workpiece along the reading-out section, and
when the code is read out, carry out a contour correction to cancel out a signal modification from an eddy-current signal detected by the eddy-current sensor, wherein the signal modification results from a modification to the surface contour along the reading-out section.

15. The working machine of claim 11, wherein the working machine is configured to:
detect a thickness of the base material of the workpiece along the reading-out section, and
when the code is read out, carry out a thickness correction to cancel out a signal modification from an eddy-current signal detected by the eddy-current sensor, wherein the signal modification results from a modification to the thickness of the base material along the reading-out section.

16. The working machine of claim 11, wherein the reading-out section comprises an isoline along which the base material of the workpiece has at least one of a unitary thickness or a planar surface.

17. The working machine of claim 11, wherein, after the reading-out of the code, the workpiece is subjected to a further treatment,
wherein the working machine is configured to code the workpiece by generating a microstructure change in the base material such that, at least in a sub-region of the coding region, a modification to the at least one of the electrical conductivity or the permeability resulting from the code is greater than that resulting from the further treatment.

18. The working machine of claim 11, wherein the evaluation device is configured to extract the local distribution of the at least one of the conductivity or the permeability of the workpiece from the calibrated eddy current signal.

19. The working machine of claim 11, wherein the working machine is a sheet metal working machine.

* * * * *